Figure 1:
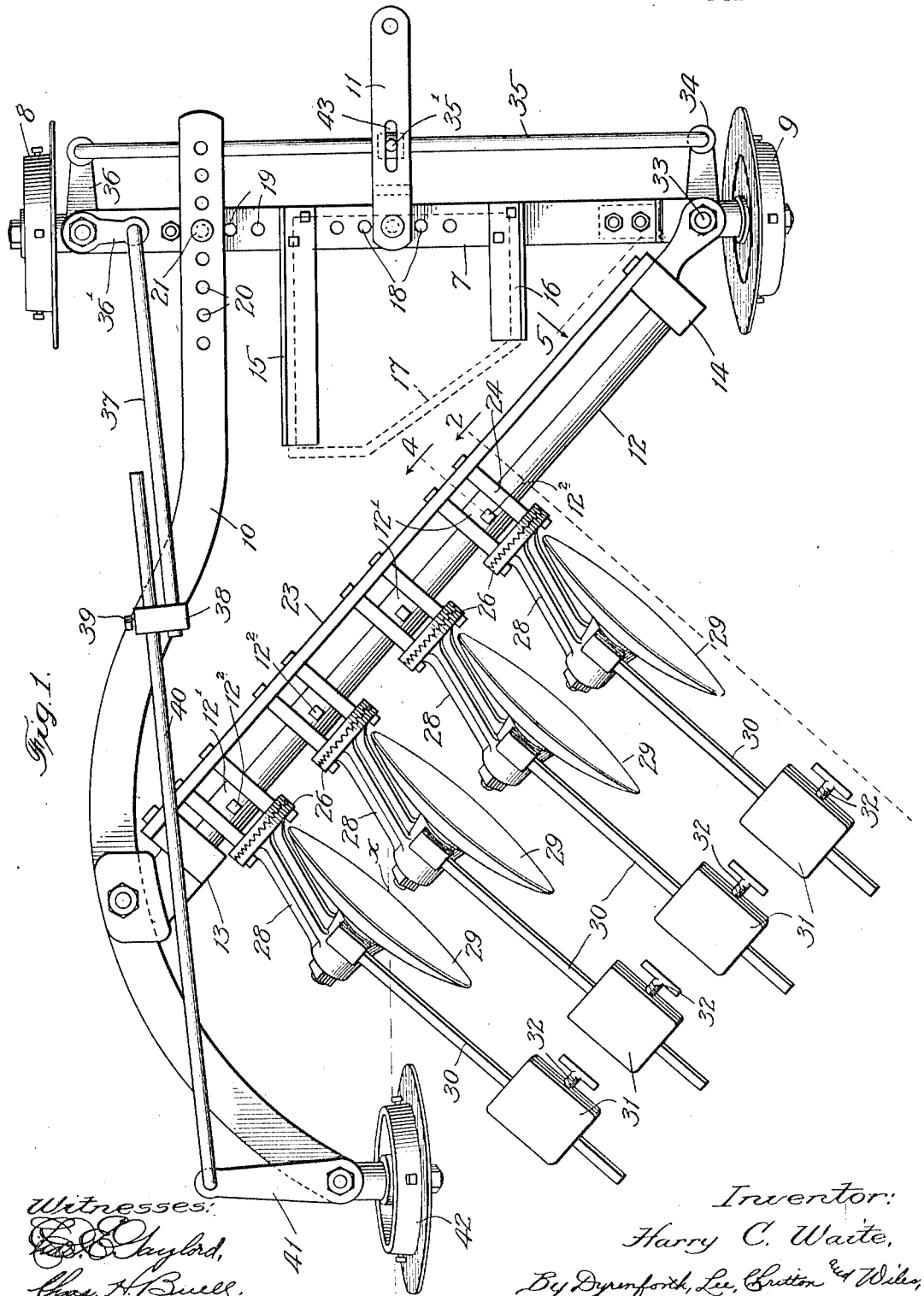

H. C. WAITE.
DISK PLOW.
APPLICATION FILED MAR. 20, 1912.
1,073,827.
Patented Sept. 23, 1913.
2 SHEETS—SHEET 2.
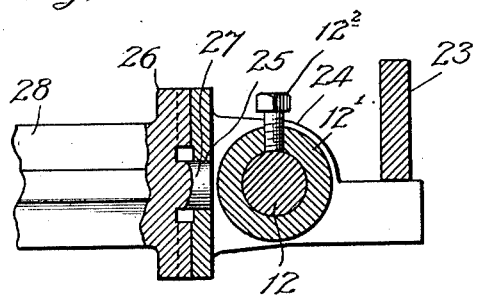
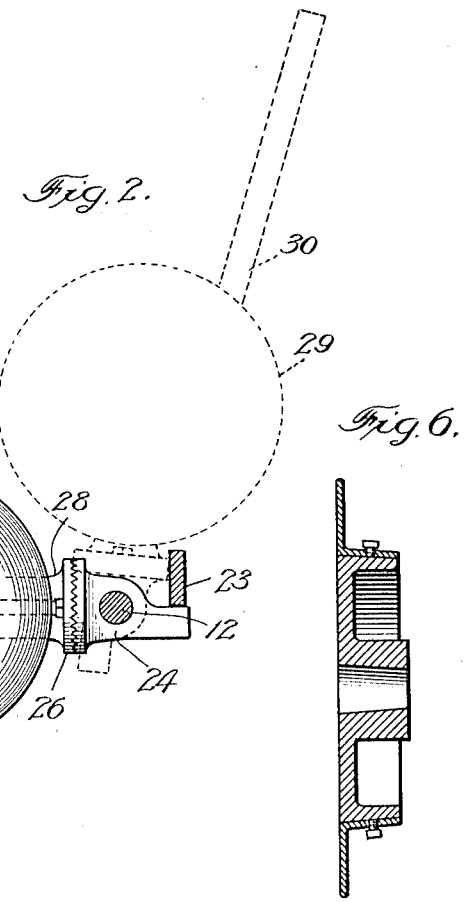
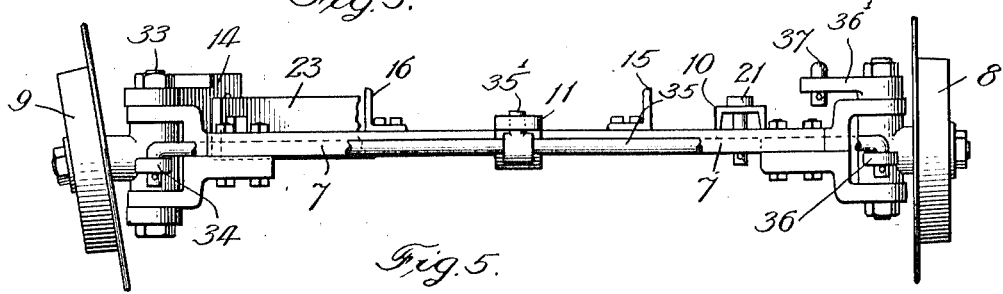
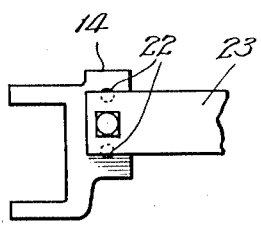

UNITED STATES PATENT OFFICE.

HARRY C. WAITE, OF LEWISTOWN, MONTANA.

DISK PLOW.

1,073,827.  Specification of Letters Patent.  Patented Sept. 23, 1913.

Application filed March 20, 1912. Serial No. 685,057.

*To all whom it may concern:*

Be it known that I, HARRY C. WAITE, a citizen of the United States, residing at Lewistown, in the county of Fergus and State of Montana, have invented a new and useful Improvement in Disk Plows, of which the following is a specification.

My invention relates to an improvement in disk-plows; and it has for its general object that of rendering a plow of this type more serviceable in working the soil, because of adjustments of parts of the machine, both when in and out of use, rendered possible by the construction hereinafter described and claimed.

In the accompanying drawings, Figure 1 is a plan view of a disk-plow embodying my improvements; Fig. 2 is a section on line 2, Fig. 1, showing one of the disks, by dotted lines, raised to its position of non-use; Fig. 3 shows the forward end of the plow by a broken view in front elevation; Fig. 4 is an enlarged section on line 4, Fig. 1; Fig. 5 is a broken view showing the adjustment, as used on each end of a stop-bar for regulating the depth of penetration of the disks, the view being regarded in the direction of the arrow on line 5, Fig. 1, and Fig. 6 is an enlarged transverse section showing the preferred construction of the plow-wheels, whereby their rims are readily removable, when worn out, to be replaced by new ones.

The draft-frame of the machine consists of a front bar 7 having a wheel 8 journaled on one end to ride perpendicularly on the ground, and a guide-wheel 9 journaled on its opposite end to incline, as shown, for riding in a furrow, as usual; a drag-bar 10 pivoted near one end to the bar 7, from which a draft-tongue 1 extends, and a disk-carrying bar 12 secured at one end in a socket 13 bolted to the drag-bar to incline, relatively to the bar 7, to a socket 14 pivotally secured thereto near the wheel 9. On the front bar are provided rigid rearwardly-extending arms 15, 16 to support a box, indicated by dotted lines at 17 in Fig. 1, suitable for carrying the weights, hereinafter described, tools and the like; and this bar is provided with a central series of holes 18, at any of which to connect the draft-tongue for adjusting the draft, and, near one end, with a series of holes 19 to register any of them with one of a longitudinal series of holes 20 in the adjacent end of the bar 10, through which to fasten it by a pivot-pin 21 to the front bar for the adjusting purpose hereinafter explained. The forward face of each socket-piece 13 and 14 is provided with a vertical series of bolt-holes 22, and a bar 23 is rigidly fastened at its ends by bolts caused to enter corresponding members in the opposite series of these holes; and when raised or lowered for the adjusting purpose hereinafter explained, this bar may be secured at the proper holes of the series thereof.

On the bar 12, which is of round cross-section, are pivotally supported a series of similar disk-carrying heads 24, the forward ends of which, shown bifurcated, project underneath the bar 23, operating as a stop, and the rear faces of which are of disk-form and serrated, and contain central sockets 25 (Fig. 4). To the serrated face of each head 24 is bolted a similarly-serrated head 26 provided with a central stud 27 for centering it in a socket 25, this head being formed on one end of an arm 28 extending inclinedly therefrom and on the opposite end of which is journaled an ordinary concavo-convex or other suitable plow-disk 29. Collars 12¹ releasably fastened by set-screws 12² surround the bar 12 between the arms of the heads to afford stops. From each head 26 extends rearwardly a tail-piece 30 having adjustably and removably secured upon it, by a set-screw 32, a weight 31.

The pivot 33 which connects the socket 14 with the front bar 7 carries a crank 34 connected by a steering-rod 35, extending parallel with the bar 7, with a crank 36 pivoted to the last-named bar adjacent to the wheel 8. Another crank 36¹ on the same pivot with the crank 36 and forming therewith practically a bell-crank, has fastened to it one end of a link-section 37, the opposite end of which is secured, as by welding, in a block 38 with the adjacent end portion, adjustably fastened by a set-screw 39, of a link-section 40, which is connected at its rear end with one end of a crank-arm 41 pivoted between its ends to the rear end of the bar 10 and having journaled on its opposite end a trailer-wheel 42. The tongue 11, which extends over the steering-rod 35, contains a longitudinal slot 43, through which a pin 35¹ on the steering-rod projects, to cause turning of the tongue to produce steering of the plow.

The described manner of supporting the disks 29 renders them independent of each other in their travel over the ground undergoing plowing, so that if any one strikes an obstruction, it alone is affected thereby; and the stop-bar 23 affords readily adjustable means for regulating the depth of penetration of the soil by the plow. Moreover, this manner of carrying the plow-disks enables them to be easily spaced to desired distances apart for producing furrows closer together or farther apart; and the ready removal of any of the disks, as when the predetermined distances apart of furrows require a reduction in the number of disks on the plow, may be readily accomplished by withdrawing the bolts fastening the respective head 26 to its companion-head 24. By turning the heads 26, when so loosened, on the studs 25, the dip of the plow-disks may be adjusted to extend at any desired angle, and secured thereat by refastening the bolts. The adjustable weights 31 serve to regulate the work of the plow-disks according to the character of the ground being plowed; and when the plow is being dragged on the road, or under other conditions when the disks are out of use, the weights may be readily stripped off the tail-pieces 30 and deposited in the box 17, thereby weighting the forward part of the machine with the resultant advantage on the draft, and the heads may be turned on their support 12 to elevate the plow-disks to the position of that shown by dotted lines in Fig. 2, where the heads rest against the stop-bar 23, thereby placing the disks out of the way. By changing the angle of inclination, from that shown in Fig. 1, of the bar 12 carrying the plow-disks relative to the line of draft, or to the bar 7, the spacing apart of the furrows may be increased, by lessening that angle, or decreased, by increasing it. This may be readily accomplished by moving the bar 10 forwardly and fastening it through one of its holes 20 and a hole 19 in the bar 7, to turn the disk-carrying bar 12 on its pivot 33 and thereby decrease the said angle of inclination, or by moving the bar 10 in the opposite direction and similarly fastening it, to thereby increase that angle of inclination.

In the furrow-making operation of the plow, the wheel 42 should aline directly with the line of draft and its lowermost section should aline with the corresponding section of the adjacent disk 29, as with the point $x$ thereon, since the wheel must trail in the furrow made by that disk. In any adjustment of the disks on the bar 12, as hereinbefore referred to, the wheel 42 requires to be adjusted to maintain its said alinement with the adjacent plow-disk, and this may readily be accomplished by shifting the bar 10 in the proper direction along the series of holes 19 and fastening it by the pin at the proper one of those holes.

In turning the plow, by its pulling traction-engine or other power hitched to the tongue 11, the tendency of the plow-disks to cut diagonally across the land is overcome by action of the steering equipment upon the wheel 42. When the plow is thus turned toward the left, at the end of a set of furrows, the deflection of the tongue 11, by its stud and slot connection with the rod 35, turns the crank $36^1$ forwardly and, through the links 37, 40, causes the arm 41 to swing on its pivot and turn the inclined wheel 42 opposite the direction of turn of the wheel 8 and toward the left into a relative position wherein it acts like a rudder to guide the plow, in so turning it, to follow the movement of the pulling power.

The flanged tires of the wheels employed tend to wear out with use of the plow; and to avoid such wear rendering the wheels wholly useless, I provide the tires separate from the wheel-centers and secure them to the latter, as by the bolts illustrated, so that when a tire is worn it may be easily removed and replaced by a new one, thereby saving the center.

I realize that considerable variation is possible in the details of construction thus specifically shown and described and I do not intend by illustrating a single, specific or preferred embodiment of my invention to be limited thereto; my intention being in the following claims to claim protection upon all the novelty there may be in my invention as broadly as the state of the art will permit.

What I claim as new and desire to secure by Letters Patent is—

1. In a wheeled plow, the combination of a wheeled draft-bar, a bar connected therewith, arms having pivotal connections at intervals with said last-named bar, stops on said connections, a stop-bar in the path of the stops for limiting the extent of depression of the arms, and plows journaled on the arms.

2. In a wheeled plow, the combination of a wheeled draft-bar, a bar connected therewith to incline relatively thereto, heads pivotally supported independently of each other at intervals on said last-named bar, plows secured to said heads, weights connected with the plows, and an adjustable stop-bar for said heads extending lengthwise of said plow-carrying bar.

3. In a wheeled plow, the combination of a draft-bar having a straight-running wheel and an inclinedly-running wheel journaled respectively on its opposite ends, a drag-bar connected near its forward end with the draft-bar near said first-named wheel, an inclinedly-running wheel journaled on the rear end of the drag-bar, a socket pivotally secured to the draft-bar near said inclinedly-running wheel thereon and a socket secured to the drag-bar toward its rear end, vertical series of holes in corresponding faces of said sockets, a stop-bar adjustably secured at its ends in said holes, a bar inclining relatively to the draft-bar and connecting said sockets, a series of heads pivotally supported at intervals on said inclining bar and projecting beneath the stop-bar, means for releasably fastening said heads rigidly to their carrying-bar, and weight-carrying elements connected with said heads.

HARRY C. WAITE.

In presence of—
 L. HEISLAR,
 R. SCHAEFER.